Nov. 1, 1960 A. C. NORRIS ET AL 2,958,538
REMOVABLE VEHICLE CONTAINER AND BODY
HAVING RETRACTABLE SUPPORTS
Filed June 2, 1958 3 Sheets-Sheet 3
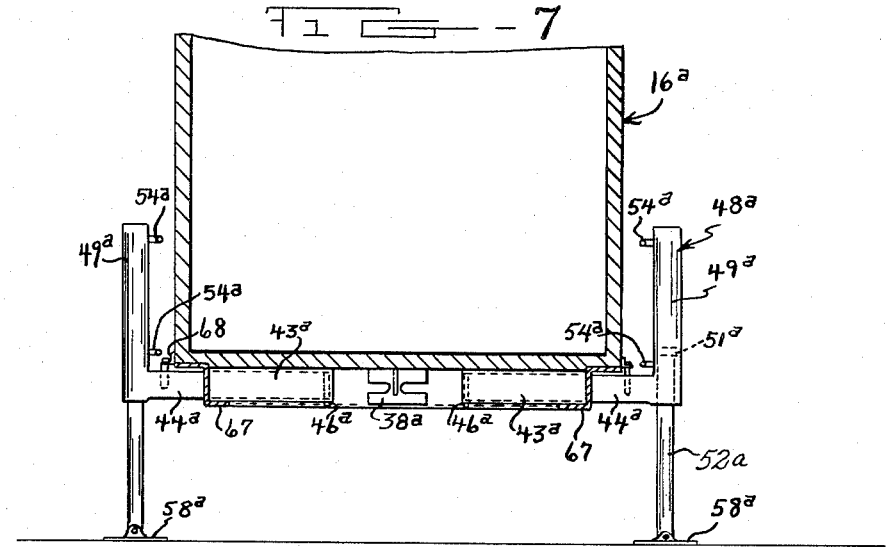
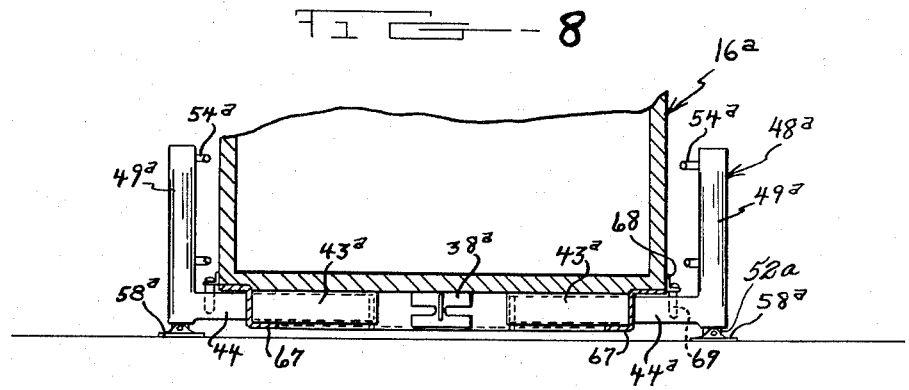
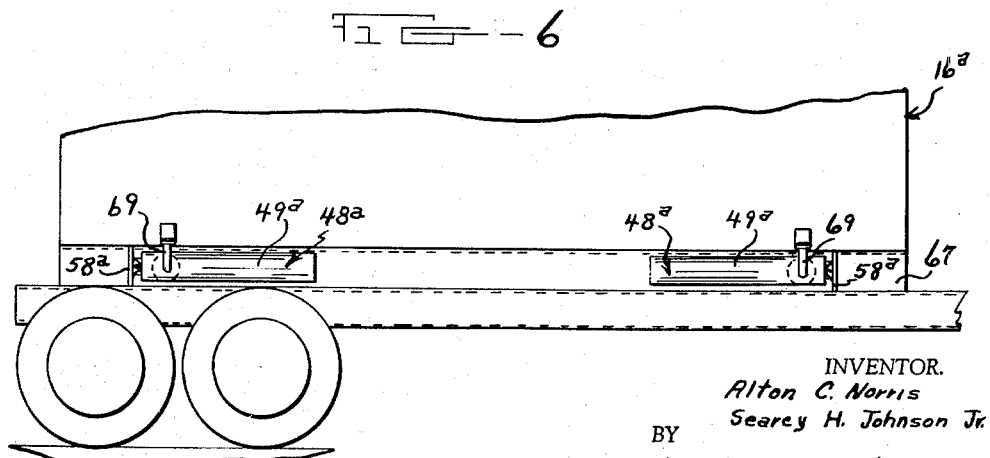
INVENTOR.
Alton C. Norris
Searcy H. Johnson Jr.
BY
Jennings, Carter & Thompson
Attorneys United States Patent Office 2,958,538
Patented Nov. 1, 1960

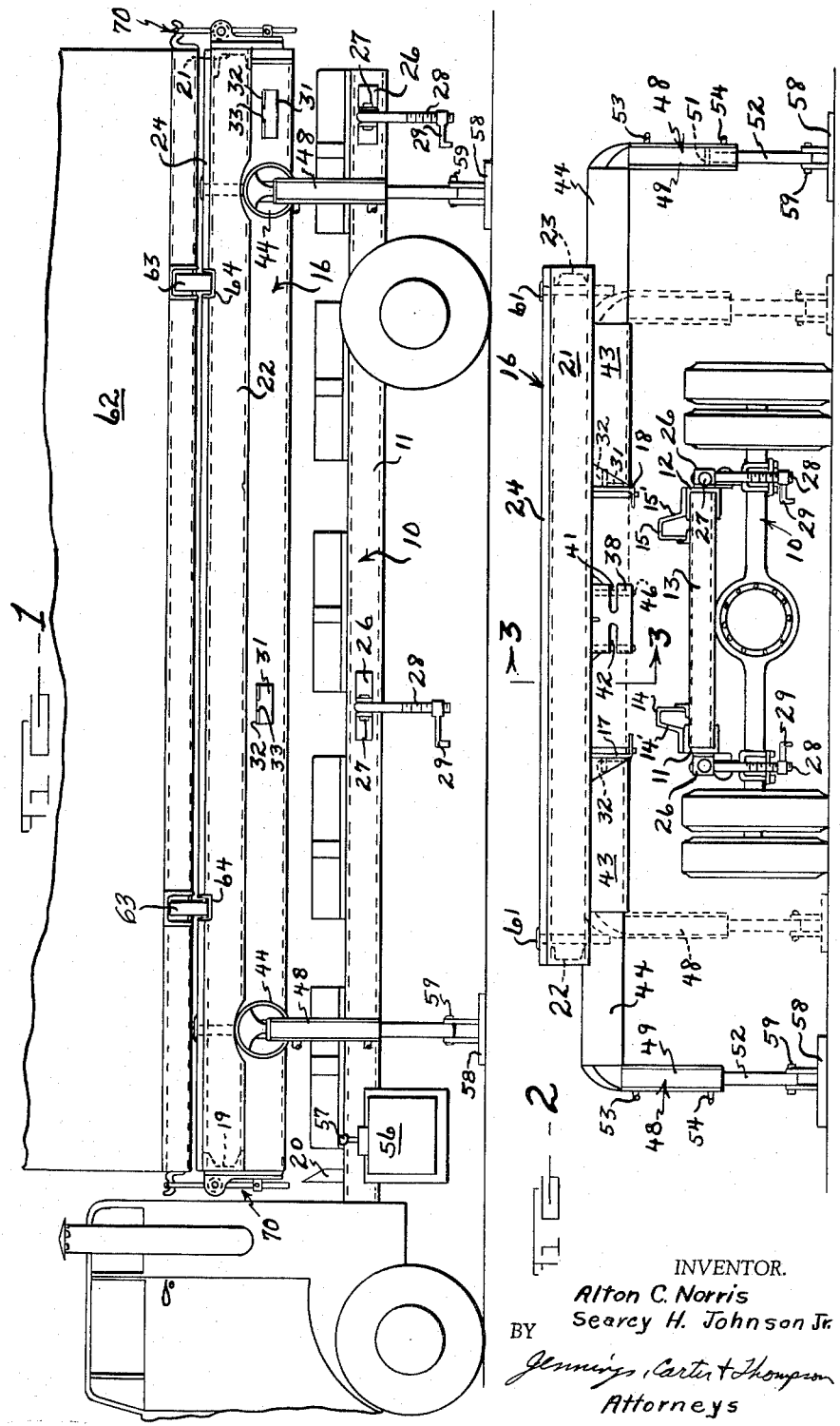

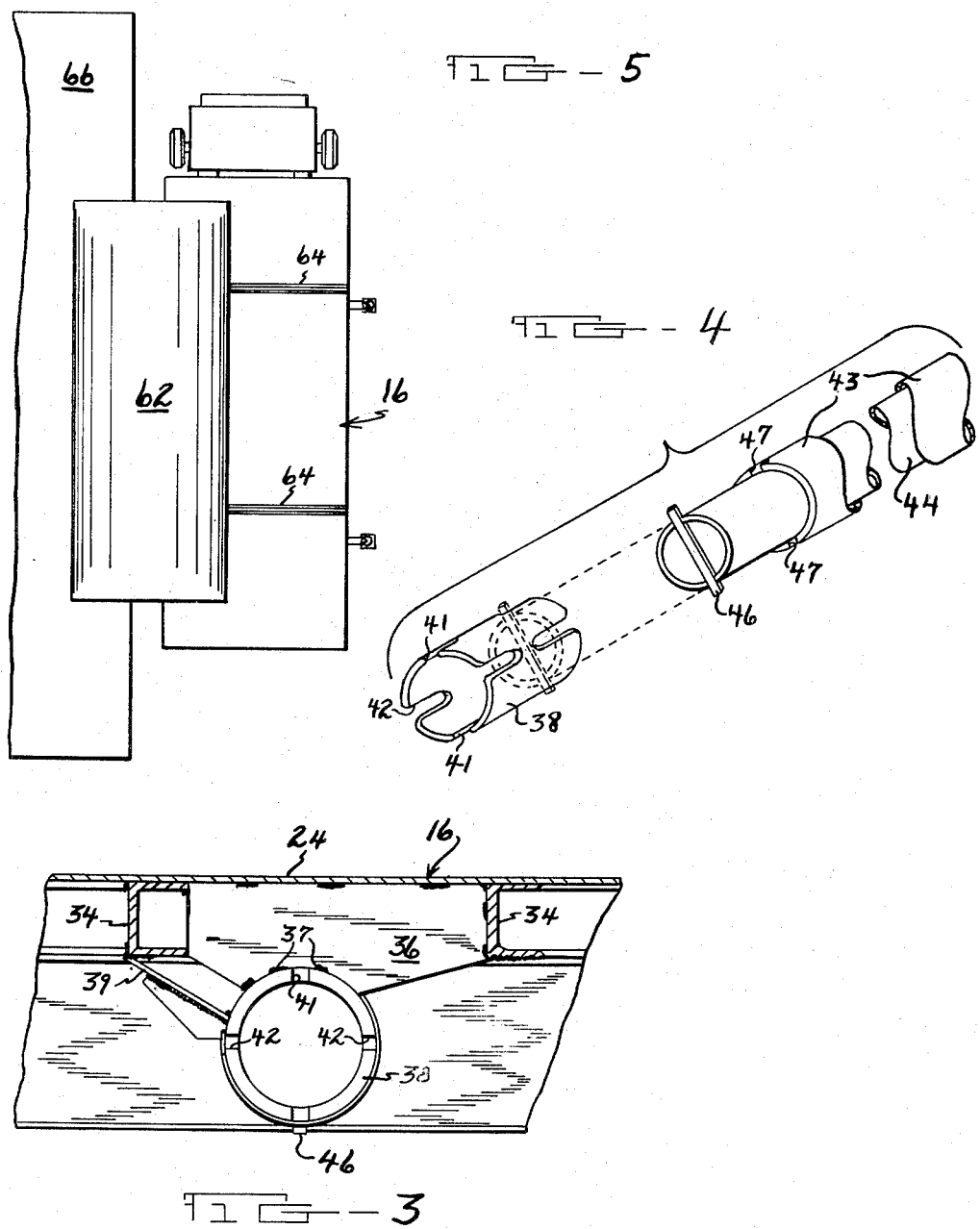

2,958,538

REMOVABLE VEHICLE CONTAINER AND BODY HAVING RETRACTABLE SUPPORTS

Alton C. Norris and Searcy H. Johnson, Jr., Birmingham, Ala., assignors to Moore-Handley Hardware Company, Inc., a corporation of Alabama Filed June 2, 1958, Ser. No. 739,326

7 Claims. (Cl. 280—34)

This invention relates to a removable vehicle container and body having retractable supports and has for an object the provision of a detachable load supporting body having retractable supports therefor.

Another object of our invention is to provide a removable vehicle body of the character designated in which the retractable supports have associated therewith improved means for holding the same in selected angular positions.

Another object of our invention is to provide a removable vehicle body having retractable supports which shall be adapted for use either as a load platform, a container or to support a superimposed removable body or container.

A further object of our invention is to provide a removable vehicle body having retractable supports which shall be simple of construction, economical of manufacture and one which is adapted for transporting containers having self-contained supporting leg members as well as containers which are not provided with such supporting members.

Briefly, our improved removable vehicle body having retractable supports comprises a load supporting platform or supporting body having self adjusting leg units carried thereby and adapted to support the load platform at selected elevations for placing the vehicle chassis beneath the load platform and removing the vehicle chassis from beneath the load platform. The load platform is detachably connected to the vehicle chassis whereby it may be easily and quickly installed and removed from the vehicle chassis. The leg units are provided with improved means for locking the same in selected angular positions relative to the load platform whereby the leg units may be supported in a vertical retracted position, a vertical extended position or in a horizontal retracted position beneath the platform.

Apparatus embodying features of our invention is illustrated in the accompanying drawings, forming a part of this application, in which:

Fig. 1 is a side elevational view, partly broken away, showing the load platform in raised position;

Fig. 2 is a rear elevational view showing the load platform in raised position;

Fig. 3 is a sectional view taken generally along the lines 3—3 of Fig. 2;

Fig. 4 is a perspective view showing the means for locking the leg units in selected angular positions;

Fig. 5 is a plan view showing the manner in which one type of removable body or container is transferred onto and removed from the load platform;

Fig. 6 is a fragmental side elevational view showing the load supporting body as being in the form of a container or van type body;

Fig. 7 is a vertical sectional view showing the container in elevated position; and, Fig. 8 is a vertical sectional view showing the container in lowered position whereby the bottom of the container is adjacent the ground engaging members.

Referring now to the drawings for a better understanding of our invention, we show a vehicle chassis 10 which comprises longitudinally extending side channels 11 and 12 which are connected by a plurality of transverse frame members 13, in a manner well understood in the art. Mounted on the vehicle chassis 10 adjacent each side thereof are a plurality of longitudinally extending positioning members 14 and 15 which may be in the form of inverted U-shaped members which are secured to the chassis 10, as shown in Fig. 2. The outer surface of the members 14 and 15 flares outwardly and downwardly as at 14' and 15' to assure proper alignment of the load platform on the chassis 10. While we show a plurality of positioning members 14 and 15, it will be apparent that a single positioning member 14 or 15 may be provided at each side of the vehicle chassis.

The detachable load supporting body, which may be in the form of a platform or rack, is indicated generally at 16 and may comprise longitundinally extending channel members 17 and 18 which support superposed transverse channel members 19 and 21 which may be positioned adjacent the front and rear, respectively, of the load supporting body. Secured to the transverse channel members 19 and 21 are longitudinally extending side channel members 22 and 23. A plate 24 is mounted on and supported by the channel members 19, 21, 22 and 23 to form a load supporting surface. As shown in Fig. 2, the channel members 17 and 18 are spaced from each other a distance to receive therebetween the members 14 and 15 carried by the chassis 10 whereby lateral shifting of the load supporting body 16 relative to the chassis frame 10 is prevented.

Mounted on the chassis frame 10 are a plurality of supporting brackets 26 each of which is adapted to pivotally support, by means of a pivot pin 27, a threaded member 28. An operating handle 29 is in threaded engagement with each threaded member 28, as shown in Fig. 1 and 2. Mounted on the load platform 16 directly above each of the support brackets 26 is a bracket 31 having an outwardly projecting flange 32 therein. A suitable recess 33 is provided in the flange 32 for receiving the threaded member 28 whereby the load platform 16 may be detachably connected to vehicle chassis 10. That is, with the load platform 16 lowered onto the vehicle chassis 10, the threaded member 28 is moved upwardly into engagement with the recess 33. The actuating member 29 is then rotated until it engages the upper surface of the flange 32, thereby securing the load platform 16 to the chassis 10. It will be apparent that other means, well known in the art, may be employed to attach the body to the vehicle chassis 10.

Secured to the under surface of the load platform 16, by any suitable means, such as by welding, are transverse channel members 34. Secured to the transverse channel members 34 and extending longitudinally of the load supporting body 16 is a support member 36. Secured to the support member 36 by any suitable means, such as by welding at 37, is a centrally disposed, transversely extending cylindrical member 38. Preferably, a cylindrical member 38 is provided adjacent the forward and rear ends of the load supporting body 16. Suitable braces or gusset plates may be employed between the cylindrical member 38 and the supporting body 16 to reinforce the same, as shown at 39 in Fig. 3. Opposite ends of the cylindrical member 38 are provided with a pair of vertically aligned recesses 41 and a pair of horizontally aligned recesses 42 for a purpose to be described hereinafter.

Mounted beneath the load supporting body 16 at opposite sides of each cylindrical member 38 are transverse tubular members or sleeves 43. Telescoping slidably within each sleeve 43 is an elongated member 44 which projects outwardly of both ends of the sleeve 43, as shown in Fig. 2. Secured to the inner end of the elongated member 44 is a transverse member 46 which is adapted to register selectively with the recesses 41 or 42 whereby the elongated member 44 is held in selected angular positions which are preferably at right angles to each other. Vertically aligned recesses 47 are also provided in the inner end of the sleeve 43 for receiving the transverse member 46 when the elongated member 44 is moved outwardly to its extreme outward position relative to the sleeve 43.

Secured to the outer end of each of the elongated members 44 is a depending leg member 48 which comprises a fluid pressure operated cylinder 49 having a piston 51 and a depending piston rod 52. Fluid is introduced into cylinder 49 at opposite sides of the piston 51 by suitable conduits 53 and 54 which are operatively connected to a valve unit 56. A suitable operating handle 57 is provided for the valve unit 56 whereby the fluid may be introduced into the cylinders 49 at opposite sides of the piston 51. While we have shown one operating handle 57 for actuating the valve unit 56, it will be understood that we may employ a separate operating handle and valve for each leg unit. The lower end of the piston rod 52 is pivotally connected to a ground engaging member 58 by means of a suitable pivot pin 59.

A suitable opening is provided in each elongated member 44 for receiving a vertically extending locking pin 61 whereby the elongated member 44 may be locked in extended position as shown in Fig. 2. Also, when the leg member 48 is moved to the retracted position, the locking pin is positioned adjacent the outer end of the elongated member 44, thereby preventing outward movement of the elongated member 44 and the leg unit 48.

In Figs. 1 and 5 we show the load supporting body 16 as supporting a removable body or container 62. The container 62 is supported by suitable rollers 63, as shown in Fig. 1. Extending transversely of the load platform 16 are parallel trackways 64 which are adapted to receive the rollers 63 whereby the container 62 may be transferred laterally from a load platform 66 onto the load platform 16. Also, it will be apparent that the container 62 could be transferred from the load platform 16 to the load platform 66. While we have shown the container 62 as being supported by rollers (it will be apparent that the rollers could be eliminated and the container could be positioned on the supporting body 16 by any suitable means. The container 62 may be attached to the body 16 by suitable latch means 70.

From the foregoing, the operation of our improved apparatus shown in Figs. 1 through 5 will be readily understood. To attach the load supporting body 16 to the vehicle chassis 10, the load supporting body 16 is supported in the elevated position by the leg units 48, as shown in Fig. 2. The vehicle chassis 10 is then backed under the load platform, as shown, and fluid is introduced into the cylinders 49 whereby the load platform 16 is lowered onto the vehicle chassis 10. As the load platform 16 moves onto the vehicle chassis 10, the outwardly tapered surfaces 14' and 15' of the members 14 and 15 guide the channel members 17 and 18 into proper position onto the vehicle chassis. Also, as the load supporting body 16 is lowered, the forward end of the load platform is engaged by a suitable guide member 20 which causes the body 16 to move into proper longitudinal relationship with the vehicle chassis 10. The threaded members 28 are then raised into engagement with the recesses 33 in the brackets 31 and the operating member 29 is rotated whereby it engages the flange 32, thereby securing the body 16 to the vehicle chassis. While we have shown longitudinally extending positioning members on the chassis 10, it will be apparent to one skilled in the art that other positioning means may be employed.

With the body 16 on the vehicle chassis, the ground engaging members 58 are raised by introducing fluid into the cylinder 49 at the proper side of piston 51. The elongated members 44 are then moved inwardly out of engagement with the recesses 47. The leg members 48 are then rotated 90° and the elongated members 44 are moved inwardly into engagement with the horizontally aligned recesses 42 in the cylindrical member 38, thereby locking the leg members in retracted position. The locking pin 61 is then inserted to prevent outward movement of the retracted leg members.

If it is desired to support the body 16 with the leg members 48 adjacent the wheels of the vehicle chassis, the leg members are moved to the position shown in dotted lines in Fig. 2. In this position, the transverse member 46 engages the vertically aligned recesses 41 in the cylindrical member 38, thereby locking the leg units 48 in vertical position. The leg members 48 are moved to this position when there is only a limited amount of space for supporting the body 16. That is, where there is ample space for supporting the body with the leg members in the fully extended position, as shown in Fig. 2, the leg members 48 assume the solid line position. However, when there is only a limited amount of space, the leg members 48 are positioned adjacent the wheels, as shown in dotted lines.

When it is desired to transfer a container either onto or from the load platform 16, the leg members 48 are moved to the vertical position and fluid is introduced into the cylinder 49 whereby the load supporting body 16 is adjusted to the proper elevation to receive the container 62. With the embodiment shown in Fig. 5, the rollers 63 move into engagement with the guideways 64 and then move either onto or from the load platform 16.

In Figs. 6, 7 and 8 we show a modified form of our invention in which the load supporting body is in the form of a container or van type body 16ᵃ. Extending longitudinally of the sides of the container 16ᵃ are substantially Z-shaped bottom rails 67. Mounted beneath the container 16ᵃ are sleeve members 43ᵃ for receiving tubular members 44ᵃ. A cylindrical member 38ᵃ is mounted beneath the container 16ᵃ and is provided with suitable recesses, as shown, for receiving a lateral detent 46ᵃ carried by the tubular members 44ᵃ. The operation of the cylindrical member 38ᵃ, the sleeve members 43ᵃ and the tubular members 44ᵃ is substantially the same as that of the members 38, 43 and 44, described in Figs. 1 through 5. Mounted at the outer ends of the tubular members 44ᵃ are fluid pressure operated cylinders 49ᵃ having a piston 51ᵃ and a piston rod 52ᵃ. The free end of the piston rod 52ᵃ is connected to a ground engaging member 58ᵃ, as shown, whereby the body 16ᵃ may be supported from the ground in either elevated position or in a lowered position adjacent the ground.

As shown in Figs. 7 and 8, the cylinders 49ᵃ are positioned above the bottom of the body 16ᵃ when the legs, indicated at 48ᵃ, are in the supporting position, whereby the body may be lowered to a position adjacent the ground engaging members 58ᵃ, as shown in Fig. 8. In this position the body or container 16a may be easily loaded adjacent the ground level without elevated platforms and the like. Fluid is introduced into opposite ends of the cylinders 49ᵃ by hose connections 54ᵃ which may be attached to a suitable fluid pressure supply, not shown.

In retracted position, the cylinders 49ᵃ assume a position within the confines of the Z-shaped rails 67, as shown in Fig. 6. Brackets 68 are mounted on the container 16ᵃ above each tubular member 44ᵃ for holding depending locking pins 69 which engage suitable openings in the tubular members 44ᵃ, thus holding the tubular members in selected axial positions relative to the sleeves 43ᵃ. Also, the locking pins 69 engage the outer side of the cylinders 49ᵃ and thus hold the leg units 48ᵃ in retracted position, as shown in Fig. 6.

From the foregoing description, it will be seen that we have devised an improved support for a removable vehicle container and body. By providing a load supporting body which is supported entirely independent of the vehicle, the body may be used either as a load platform or may be employed with a container which is loaded onto the load platform. Also, the container 62 may be of the conventional type without supporting legs therefor. It will be apparent, however, that containers having support means therefor may also be transported on our improved load platform. Also, by providing a load platform which is detachable from the vehicle chassis, the vehicle chassis may be employed to position the load platform and then may be detached therefrom and employed to move other platforms, thereby permitting a single vehicle to handle a plurality of load platforms. Furthermore, by providing a load supporting body which may be lowered to substantially ground engaging position, the body may be easily loaded with conventional type lift trucks and the like without having to provide elevated platforms for the lift trucks.

While we have shown our invention in several forms, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. The combination with a vehicle chassis of, a supporting body, a tubular member extending transversely beneath and secured to said supporting body adjacent opposite sides thereof, elongated members telescoping slidably within the tubular members and projecting outwardly of both ends of said tubular members, elongated supporting legs mounted adjacent the outer ends of said elongated members, means for varying the length of said legs whereby said body is supported at selected elevations, a transverse member mounted adjacent the inner end of each of said elongated members, a stationary member carried by said body positioned between the inner ends of and in transverse alignment with said elongated members and having at least one vertically aligned recess therein at opposite ends thereof adapted to receive said transverse members and thereby hold said legs in a vertical position, there being at least one horizontally aligned recess in said opposite ends of said stationary member adapted to receive said transverse members and thereby hold said legs in a horizontal position, there being at least one recess in each of said tubular members in position to receive said transverse members and thereby hold said legs in a selected angular position when the elongated members are moved outwardly of the supporting body, and means detachably connecting said supporting body to said vehicle chassis when said supporting body is lowered onto said chassis.

2. A support for a removable vehicle body comprising a pair of oppositely disposed sleeve members extending transversely beneath and secured to said body adjacent opposite sides thereof, elongated members telescoping slidably within said sleeve members and projecting outwardly of both ends of said sleeve members, elongated supporting legs mounted adjacent the outer ends of said elongated members, means for varying the length of said legs whereby said body is supported at selected elevations, a transverse member mounted adjacent the inner ends of said elongated members, a vertically aligned recess in the inner ends of said sleeve members adapted to receive said transverse members and hold said legs in a vertical position when the elongated members are moved outwardly of the supporting body, a stationary member carried by said body between the inner ends of said elongated members and having at least one vertically aligned recess at opposite ends thereof adapted to receive said transverse members and thereby hold said legs in a vertical position, and there being at least one horizontally aligned recess on opposite ends of said stationary member adapted to receive said transverse members and thereby hold said legs in a horizontal position.

3. A support for a removable vehicle body as defined in claim 2 in which the stationary member comprises a sleeve-like member having vertically aligned recesses at opposite ends thereof disposed to receive the transverse members and hold the legs in a vertical position, there being horizontally aligned recesses at opposite ends of said sleeve-like member disposed to receive the transverse members and hold the legs in a horizontal position.

4. A support for a removable vehicle body as defined in claim 2 in which locking means is provided to lock the elongated members in selected axial positions relative to the sleeve members.

5. A support for a removable vehicle body comprising a pair of oppositely disposed sleeve members extending transversely beneath and secured to said body adjacent opposite sides thereof, an elongated member telescoping slidably within each of the sleeve members and projecting outwardly of both ends of the sleeve members, an elongated supporting leg mounted adjacent the outer end of each of said elongated members, means for varying the length of said legs whereby said body is supported at selected elevations, a stationary member secured to said body intermediate the inner ends of said elongated members and in transverse alignment therewith, the ends of said stationary member facing said elongated members and having locking elements thereon to position said elongated members in horizontal and vertical positions when the elongated members are in an inward position, complementary locking elements on the inner ends of said elongated members engaging the locking elements on said stationary member to position the elongated members in selected horizontal and vertical positions when in an inward position, and the inner ends of said sleeve members having complementary locking elements thereon engaging said locking elements on said elongated members to position the elongated members in a vertical position when in an outward position whereby said supporting legs may be positioned in outward and inward vertical positions.

6. A support for a removable vehicle body comprising a pair of oppositely disposed sleeve members extending transversely beneath and secured to said body adjacent opposite sides thereof, an elongated member telescoping slidably within each of the sleeve members and projecting outwardly of both of the sleeve members, an elongated supporting leg mounted adjacent the outer end of each of said elongated members, means for varying the length of said legs whereby said body is supported at selected elevations, a stationary member secured to said body intermediate the inner ends of said elongated members and in longitudinal alignment therewith, said stationary member having opposite ends facing said elongated members with said ends having locking elements thereon to position said elongated members in selected horizontal and vertical positions, locking elements on the inner ends of said sleeve members, and complementary locking elements on the inner ends of said elongated members engaging the locking elements on the stationary member and the sleeve members, both of said elongated members thereby being positioned by the stationary member in horizontal and vertical positions.

7. A support for a removable vehicle body comprising a pair of oppositely disposed sleeve members extending transversely beneath and secured to said body adjacent opposite sides thereof, an elongated member telescoping slidably within each of the sleeve members and projecting outwardly of both ends of the sleeve members, a locking element carried by the inner end of each elongated member, an elongated supporting leg mounted adjacent the outer end of each of said elongated members, means for varying the length of said legs whereby said body is supported at selected elevations, a stationary member secured to said body intermediate the inner ends of said sleeve members and in longitudinal alignment therewith, said stationary member having opposite ends facing said elongated members and having locking elements thereon in position to engage the locking elements on the elongated members to hold said elongated members in selected angular positions when in an inward position, and the inner ends of said sleeve members having complementary locking elements thereon engaging said locking elements on said elongated members to position said supporting legs in a vertical position when said elongated members are in an outward position.

References Cited in the file of this patent

UNITED STATES PATENTS

| | | |
|---|---|---|
| 1,290,694 | Angle | Jan. 7, 1919 |
| 1,303,854 | Clark | May 20, 1919 |
| 2,019,656 | Corby et al. | Nov. 5, 1935 |
| 2,172,244 | Grundler | Sept. 5, 1939 |
| 2,555,336 | Hagely | June 5, 1951 |
| 2,751,234 | Couse | June 19, 1956 |
| 2,808,289 | Scoby | Oct. 1, 1957 |
| 2,811,386 | Shaw | Oct. 29, 1957 |
| 2,847,137 | Stringfellow | Aug. 12, 1958 |